United States Patent
Lee et al.

(10) Patent No.: US 8,029,834 B2
(45) Date of Patent: Oct. 4, 2011

(54) METHOD OF MAKING BREAD AND BREAD MADE BY THE METHOD

(75) Inventors: Myoung Gu Lee, Seoul (KR); Jong Min Lee, Seongnam-si (KR); Gil Hong Cha, Seongnam-si (KR)

(73) Assignee: Paris Croissant Co., Ltd., Songnam-Shi, Kyoungki-Do (KR)

( * ) Notice: Subject to any disclaimer, the term of this patent is extended or adjusted under 35 U.S.C. 154(b) by 0 days.

(21) Appl. No.: 12/418,536

(22) Filed: Apr. 3, 2009

(65) Prior Publication Data
US 2010/0255150 A1    Oct. 7, 2010

(51) Int. Cl.
*A21D 2/00*    (2006.01)
*A21D 8/02*    (2006.01)

(52) U.S. Cl. ............... 426/19; 426/60; 426/62; 426/656

(58) Field of Classification Search ............ 426/19, 426/60, 62, 656, 458
See application file for complete search history.

(56) References Cited

U.S. PATENT DOCUMENTS 3,375,117 A * 3/1968 Schremmer ............... 426/62
4,904,485 A * 2/1990 Hirakawa et al. .......... 426/62
5,789,011 A * 8/1998 Kobori et al. .............. 426/611

FOREIGN PATENT DOCUMENTS
JP    2005110698    *    4/2005

OTHER PUBLICATIONS

American Society of Heating, Refrigerating and Air-Conditioning Engineers, Inc. 2006 ASHRAE Handbook—Refrigeration (I-P Edition). Chapter 28, Bakery Products. Online version available at: http://knovel.com/web/portal/browse/display?_EXT_KNOVEL_DISPLAY_bookid=2395&VerticalID=0.*
JP2005110698. English Translation. Accessed online from JPO.*

* cited by examiner

*Primary Examiner* — Humera Sheikh
*Assistant Examiner* — Saeeda Latham
(74) *Attorney, Agent, or Firm* — patenttm.us

(57) ABSTRACT

The bread making method includes cold sponge, dough, and second fermentation processes. For cold sponge, 18 to 19.5 parts strong flour, 0.18 to 0.21 parts dried yeast, 0.03 to 0.036 parts yeast food, 0.06 to 0.09 parts salt, 0.06 to 0.09 parts improver, and 10.2 to 11.4 parts water are mixed at a temperature, low speed stirred, high speed stirred, and fermented. In the dough process, the resulting mixture of the cold sponge process is mixed with 12 to 13.5 parts strong flour, 2.1 to 2.7 parts sugar, 0.45 to 0.54 parts salt, 0.9 to 20 1.5 parts dried milk, 0.09 to 0.15 parts dried yeast, 2.1 to 3 parts margarine, and 8.1 to 9.3 parts water, and the resulting mixture is given floor and bench time and divided into pieces. In the second fermentation process, the pieces are molded and fermented.

8 Claims, 3 Drawing Sheets

METHOD OF MAKING BREAD AND BREAD MADE BY THE METHOD

BACKGROUND OF THE INVENTION

1. Field of the Invention

The present invention relates to a method of making bread and bread made by the method, and more particularly, to a method of making bread that can increase taste appeal and slow aging by fermenting dough at a low temperature for a long time to improve its texture and flavor, and bread made by the method.

2. Description of Related Art

Typically, bread is made by mixing wheat flour, yeast, salt, water, etc., as main ingredients, and sugar, dairy products, eggs, oil, etc., as secondary ingredients, to form a dough, and fermenting and baking the dough. Nowadays, people's busy lifestyles, changes in dietary habits, and westernization of culture have led to large consumption of bread, plain or in the form of toast, sandwiches, etc.

Bread-making properties of wheat flour, especially, the quality and quantity of protein, are important indicators of the quality of bread. Yet even if the same ingredients are used, bread quality varies widely according to bread-making method.

Bread-making methods include a straight dough process, a sponge dough method, a continuous dough mixing process, a liquid fermentation process, etc. In the sponge dough method, also called a sponge method, a portion (more than 50%) of wheat flour is mixed with yeast and water to form a sponge. After a first fermentation for at least two hours, the sponge is mixed with the remaining portion of wheat flour, secondary ingredients (such as sugar or salt), and water, and the resulting mixture is given a floor time, subjected to a molding process, etc., and then subjected to a second fermentation. It is known in the art that the sponge dough method increases the stability of fermentation, promotes expansion of the dough due to ripening, and improves the flavor of the bread.

However, the first fermentation process, which has a significant effect on the quality of bread in the sponge dough method, is performed at a low or high temperature for a relatively short time, and thus the texture and volume of bread deteriorate.

Moreover, the dough produces various aromatic substances by alcohol fermentation, lactic acid fermentation, and fermentation with other organic acids after proper ripening, and thus the flavor of bread is improved. At the same time, the dough has physical properties such as proper viscosity and elasticity. However, the first fermentation process according to the conventional method has the following problems. In the event of a power failure or some other accident in a fermentation room, the fermentation time and temperature, which are the most important factors determining the quality of bread, can easily exceed standards, causing the dough to be under-ripened or over-ripened. Since such dough cannot ensure uniform taste, the whole quantity of dough should be disposed of, which is very costly and significantly reduces production efficiency. Thus, the first fermentation process is not suitable for mass production.

Meanwhile, while salt, egg, yeast, etc., are mainly used as secondary ingredients of bread, various bread products having unique sensory and nutritional characteristics have been developed using secondary ingredients and extracts for improving taste appeal, nutritional value, anti-aging properties, shelf life, etc.

However, some secondary ingredients added to bread may adversely affect the texture, volume, flavor, crumb characteristics, sensory characteristics, and aging of the bread, and thus deteriorate the quality of the bread. Therefore, it is necessary to develop a bread-making method that can improve the quality of bread.

After several years of research aimed at developing a bread-making method that can improve the texture and flavor of bread and slow the aging process, the present inventor arrived at the present invention.

SUMMARY OF THE INVENTION

The present invention is directed to a method of making bread that can increase taste appeal and productivity, and bread made by the method.

The present invention is also directed to a method of making bread that can slow the aging process, and bread made by the method.

In one aspect, the present invention provides a method of making bread including a cold sponge process, a dough process, and a second fermentation process. In the cold sponge process, 18 to 19.5 parts by weight strong flour, 0.18 to 0.21 parts by weight dried yeast, 0.03 to 0.036 parts by weight yeast food, 0.06 to 0.09 parts by weight salt, 0.06 to 0.09 parts by weight an improver, and 10.2 to 11.4 parts by weight water are mixed at a temperature of 15 to 17° C., stirred at low speed for 2 to 4 minutes, stirred at high speed for 1 to 2 minutes, and then fermented at a temperature of 2 to 4° C. and a relative humidity of 90 to 95% for 15 to 18 hours. In the dough process, the resulting mixture of the cold sponge process is mixed with 12 to 13.5 parts by weight strong flour, 2.1 to 2.7 parts by weight sugar, 0.45 to 0.54 parts by weight salt, 0.9 to 1.5 parts by weight dried milk, 0.09 to 0.15 parts by weight dried yeast, 2.1 to 3 parts by weight margarine, and 8.1 to 9.3 parts by weight water, and the resulting mixture is given a floor time of 15 to 20 minutes and a bench time of 15 to 20 minutes and then divided into dough pieces. In the second fermentation process, each of the divided dough pieces is molded and subjected to a second fermentation at a temperature of 36 to 40° C. and a relative humidity of 90 to 95% for 50 to 60 minutes.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE INVENTION

Hereinafter, exemplary embodiments of the present invention will be described in detail with reference to the accompanying drawings.

Terms used herein are defined based on functions in the present invention and will be construed to cover concepts corresponding to the sprit of the present invention and inherent meanings generally used in the art.

Further, when it is deemed that describing certain well-known functions or components would detract from the clarity and concision of the description of the invention, the well-known functions or components will not be described.

Figure 1:
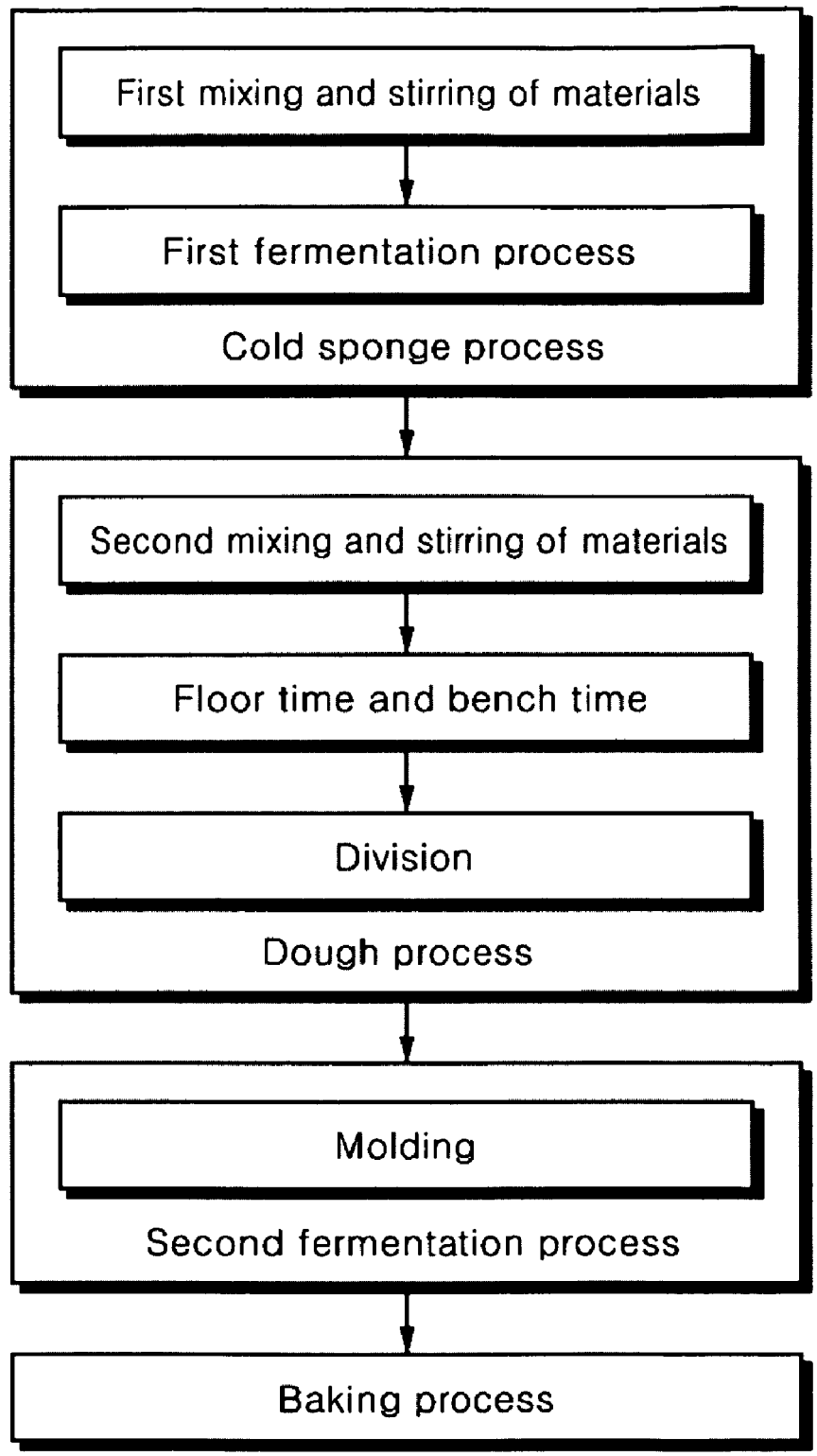
FIG. 1 is a flowchart illustrating a method of making bread in accordance with an embodiment of the present invention.

As shown in FIG. 1, a method of making bread in accordance with an embodiment of the present invention includes a cold sponge process, a dough process, and a second fermentation process.

In the cold sponge process, a portion of strong flour is mixed with other ingredients such as yeast and water to form a sponge, and the sponge is fermented.

In detail, 18 to 19.5 parts by weight strong flour for bread making, 0.18 to 0.21 parts by weight dried yeast, 0.03 to 0.036 parts by weight yeast food, 0.06 to 0.09 parts by weight salt, 0.06 to 0.09 parts by weight an improver, and 10.2 to 11.4 parts by weight water are mixed at a temperature of 15 to 17° C. The resulting mixture is stirred at a temperature at which the activity of the yeast is reduced and at low speed for 2 to 4 minutes and then stirred at high speed for 1 to 2 minutes.

At this time, in the mixing and fermentation process, connection and ripening of gluten occurs so that a soft and smooth gluten layer is obtained.

Next, the resulting mixture is fermented at a temperature of 2 to 4° C. and a relative humidity of 90 to 95% for 15 to 18 hours in accordance with the embodiment of the present invention.

Preferably, the fermentation temperature of the cold sponge process is set to 3° C. and the fermentation time is set to 16 hours so as give the bread a softer and chewier texture.

The above-described cold sponge process allows the sponge to be fermented slowly and ripened enough by its temperature distribution, thus offering appetizing flavor. Moreover, the yeast produces a three-dimensional network structure by the gluten slowly and naturally to improve the flavor of the bread and significantly slow the aging process.

In the dough process, the resulting mixture of the cold sponge process is mixed with other ingredients to form a dough.

In detail, the resulting mixture of the cold sponge process is mixed with 12 to 13.5 parts by weight strong flour, 2.1 to 2.7 parts by weight sugar, 0.45 to 0.54 parts by weight salt, 0.9 to 1.5 parts by weight dried milk, 0.09 to 0.15 parts by weight dried yeast, 2.1 to 3 parts by weight margarine, and 8.1 to 9.3 parts by weight water.

Next, the mixed dough is given a floor time of 15 to 20 minutes and a bench time of 15 to 20 minutes such that the softness and stability of the mixed dough are increased, and is then subjected to a division process.

The second fermentation process is performed to promote the ripening and expansion of the gluten so as to obtain bread of desirable shape and texture.

In the second fermentation process, the dough recovered during the bench time is fed into a molder to deflate the dough to the extent that the dough is not cut by a roller. Then, the resulting dough is rolled out, molded, and then subjected to a second fermentation at a temperature of 36 to 40° C. to increase the activity of the yeast, and a relative humidity of 90 to 95% to provide desired elasticity to the dough, for 50 to 60 minutes.

The embodiment of the present invention including the above-described processes makes bread of better quality than the conventional sponge method.

Embodiment 1

18 parts by weight strong flour, 0.19 parts by weight dried yeast, 0.03 parts by weight yeast food, 0.07 parts by weight salt, 0.06 parts by weight an improver, and 10.6 parts by weight water were mixed. During mixing, the temperature was maintained at 15 to 17° C. Subsequently, the mixture was stirred at low speed for 4 minutes, stirred at high speed for 2 minutes, and then fermented at a temperature of 3° C. for 16 hours. At this time, the relative humidity was maintained at 90 to 95%.

Next, the resulting mixture was mixed with 13 parts by weight strong flour, 2.3 parts by weight sugar, 0.48 parts by weight salt, 0.13 parts by weight dried milk, 0.12 parts by weight dried yeast, 2.9 parts by weight margarine, and 9.1 parts by weight water, and the resulting mixture was given a floor time of 15 minutes and a bench time of 20 minutes and then divided into equal-sized pieces.

Then, each of the divided dough pieces was molded and subjected to a second fermentation at a temperature of 38° C. for 50 to 60 minutes. At this time, the relative humidity was maintained at 90 to 95%.

The dough pieces after the fermentation were placed in an oven and baked at 200° C. for 30 minutes.

Embodiment 2

19 parts by weight strong flour, 0.19 parts by weight dried yeast, 0.03 parts by weight yeast food, 0.07 parts by weight salt, 0.08 parts by weight an improver, and 11.1 parts by weight water were mixed. During mixing, the temperature was maintained at 15 to 17° C. Subsequently, the mixture was stirred at low speed for 4 minutes, stirred at high speed for 2 minutes, and then fermented at a temperature of 2° C. for 16 hours. During fermentation, the relative humidity was maintained at 90 to 95%.

Next, the resulting mixture was mixed with 12 parts by weight strong flour, 2.1 parts by weight sugar, 0.46 parts by weight salt, 0.9 parts by weight dried milk, 0.1 parts by weight dried yeast, 2.3 parts by weight margarine, and 8.9 parts by weight water, and the resulting mixture was given a floor time of 15 minutes and a bench time of 20 minutes and then divided into equal-sized pieces.

Then, each of the divided dough pieces was molded and subjected to a second fermentation at a temperature of 38° C. for 50 to 60 minutes. During fermentation, the relative humidity was maintained at 90 to 95%.

The dough pieces after the fermentation were placed in an oven and baked at 200° C. for 30 minutes.

COMPARATIVE EXAMPLE 19 parts by weight strong flour, 0.19 parts by weight dried yeast, 0.03 parts by weight yeast food, 0.07 parts by weight salt, 0.08 parts by weight an improver, and 11.1 parts by weight water were mixed. During mixing, the temperature was maintained at 15 to 17° C. Subsequently, the mixture was stirred at low speed for 4 minutes, stirred at high speed for 2 minutes, and then fermented at a temperature of 18° C. for 16 hours. During fermentation, the relative humidity was maintained at 90 to 95%.

Next, the resulting mixture was mixed with 12 parts by weight strong flour, 2.1 parts by weight sugar, 0.46 parts by weight salt, 0.9 parts by weight dried milk, 0.1 parts by weight dried yeast, 2.3 parts by weight margarine, and 8.9 parts by weight water, and the resulting mixture was given a floor time of 15 minutes and a bench time of 20 minutes and then divided into equal-sized pieces.

Then, each of the divided dough pieces was molded and subjected to a second fermentation at a temperature of 38° C.

for 50 to 60 minutes. During fermentation, the relative humidity was maintained at 90 to 95%.

The dough pieces after the fermentation were placed in an oven and baked at 200° C. for 30 minutes.

[Sensory Evaluation]

Figure 2A:
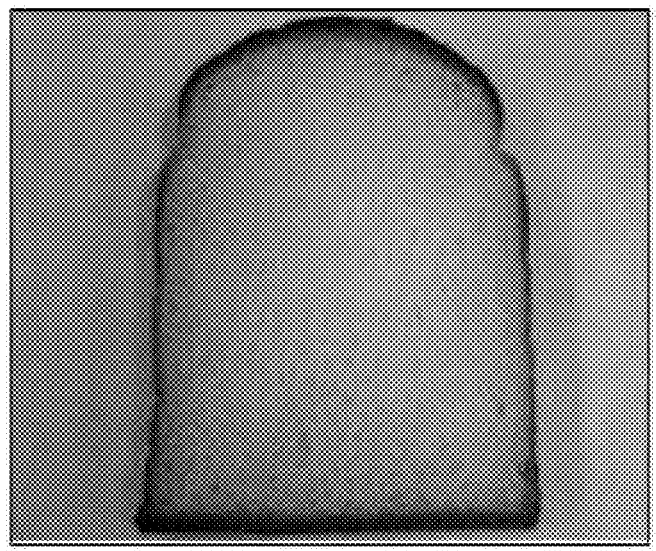
FIG. 2A is a photograph of a slice of bread made in accordance with a Comparative Example.
Figure 2B:
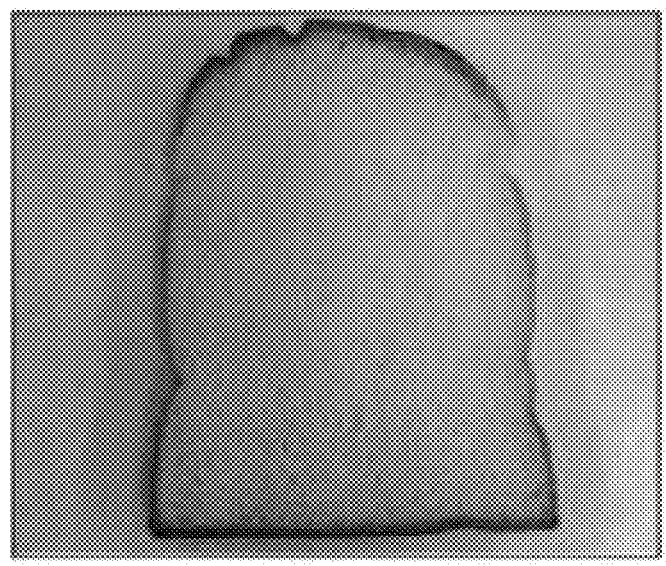
FIG. 2B is a photograph of a slice of bread made in accordance with Embodiment 1 of the present invention.

As shown in the photograph of FIG. 2B, the bread made according to Embodiment 1 of the present invention has smooth and soft pores compared to the bread made according to the Comparative Example shown in FIG. 2A. Moreover, since the inside of the bread of Embodiment 1 is dense and uniform, its volume and texture are excellent, which has a good effect on the shape of the bread, and thus there is a significant difference in visual appeal.

Meanwhile, a sensory evaluation was carried out on the breads made according to Embodiments 1 and 2 of the present invention and the bread according to the Comparative Example of the conventional method. The breads were left at room temperature for one day and cut to a predetermined size. Thirty housewives, selected based on their reliability and interest in the evaluation, participated in the sensory evaluation after the objects of the test and the evaluation method were explained to them.

To perform tasting, each of the participants ate a piece of bread, evaluated the corresponding sample, rinsed her mouth with bottled water, and then tasted another sample.

To perform the evaluation, each of the participants evaluated six sensory properties—overall taste appeal, flavor, taste, softness, chewiness, and moistness—of the samples of Embodiments 1 and 2 and the Comparative Example according to a 5-point scale (5-very good, 4-good, 3-average, 2-bad, and 1-very bad).

The resulting average scores for each item are shown in the following Table 1:

TABLE 1

| Item | Average score | | |
|---|---|---|---|
| | Comparative Example | Embodiment 1 | Embodiment 2 |
| Flavor | 3.9 | 4.2 | 4.2 |
| Taste | 3.3 | 4.1 | 3.9 |
| Softness | 3.8 | 4.4 | 4.2 |
| Chewiness | 4.1 | 4.2 | 4.1 |
| Moistness | 4.0 | 4.2 | 4.0 |
| Overall taste appeal | 4.2 | 4.4 | 4.3 |

It can be seen from the above results of the sensory evaluation that Embodiments 1 and 2 of the present invention showed significant differences from the Comparative Example with respect to each of flavor, taste, softness, chewiness, moistness, and overall taste appeal.

That is, it can be seen that the quality and taste appeal of the breads according to Embodiments 1 and 2 were higher than those of the bread according to the Comparative Example.

[Aging Test]

To examine the effect of the method of making bread in accordance with the present invention on the shelf life of the samples, the samples according to Embodiments 1 and 2 and the Comparative Example were cut to a thickness of 10 mm, 50 pieces for each sample were wrapped in polyethylene film and placed in an incubator at 30° C. to perform a decay test.

The internal temperature during wrapping was 30° C., and the decay time was determined as the time when the sample began to mold or give off an offensive odor. The average shelf-lives are shown in the following Table 2, and the average decay rates are shown in the following Table 3:

TABLE 2

| | Elapsed days | | | | | | | | | |
|---|---|---|---|---|---|---|---|---|---|---|
| | Days | | | | | | | | | Average shelf life (Days) |
| Sample group | 0 | 1 | 2 | 3 | 4 | 4.5 | 5 | 5.5 | 6 | |
| Comparative Example | – | – | – | – | – | + | + | + | + | 4.5 |
| Embodiment 1 | – | – | – | – | – | – | – | + | + | 5.5 |
| Embodiment 2 | – | – | – | – | – | – | – | + | + | 5.5 |

TABLE 3

| | Average decay rate (%) Days | | | | |
|---|---|---|---|---|---|
| Sample group | 4 | 4.5 | 5 | 5.5 | 6 |
| Comparative Example | 0 | 60 | 100 | — | — |
| Embodiment 1 | 0 | 0 | 20 | 60 | 100 |
| Embodiment 2 | 0 | 0 | 45 | 85 | 100 |

As can be seen from the above results, the samples in the Comparative Example started to decay after an average of 4.5 days, and all completely decayed by the fifth day. However, the samples in Embodiments 1 and 2 did not change until the fifth day, started to decay after an average of 5.5 days, and all completely decayed by the sixth day.

The samples in the Comparative Example showed an average decay rate of 60 to 100% from 4.5 days to 5 days, whereas, the samples in Embodiments 1 and 2 showed an average decay rate of 20 to 85% from 5 days to 5.5 days and showed an average decay rate of 60 to 100% from 5.5 days to 6 days.

Figure 3A:
FIG. 3A is a photograph showing a decayed state of the bread made in accordance with the Comparative Example.
Figure 3B:
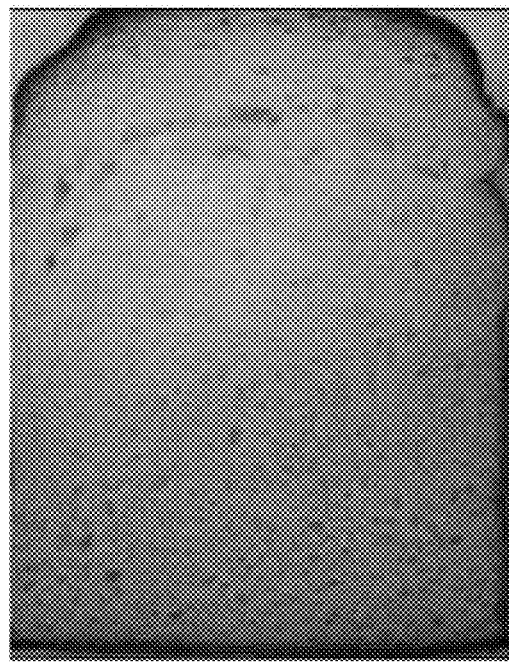
FIG. 3B is a photograph showing a decayed state of the bread made in accordance with Embodiment 1 of the present invention.

FIGS. 3A and 3B are photographs showing decayed states of the samples of the Comparative Example and Embodiment 1 after storage at room temperature for 7 days. As shown in the photographs, while some mold was growing on the surface of the sample according to the Comparative Example, the external appearance of the sample according to Embodiment 1 of the present invention was quite good and the flavor also remained.

Thus, the average shelf life of Embodiments 1 and 2 were increased by about one day, compared to that of the Comparative Example, and the aging process was also slowed, from which it can be seen that the time required for the bread to completely decay increased.

As described above, the bread made by the method in accordance with the embodiment of the present invention has excellent texture and flavor, thus enhancing its taste appeal. Moreover, anti-aging effect is increased to significantly improve shelf life and thus extend the commercial expiration date.

Further, since the first fermentation process according to the present invention is performed at a low temperature, it is possible to prevent the quality of dough from deteriorating for a predetermined period of time even if a power failure or some other accident occurs in a fermentation room. Thus, it is possible to prevent the dough from being under-ripened or over-ripened due to a temporary change in temperature in the fermentation room during the first fermentation process, thus preventing loss of materials and increasing productivity.

While exemplary embodiments of the present invention have been described and illustrated, it should be understood that various modifications to the described embodiments, which may be evident to those skilled in the art, can be made without departing from the spirit and scope of the present invention as defined by the appended claims.

The invention claimed is:

1. A method of making bread, comprising:
a cold sponge process in which 18 to 19.5 parts by weight strong flour, 0.18 to 0.21 parts by weight dried yeast, 0.03 to 0.036 parts by weight yeast food, 0.06 to 0.09 parts by weight salt, 0.06 to 0.09 parts by weight an improver, and 10.2 to 11.4 parts by weight water are mixed at a temperature of 15 to 17° C., stirred at low speed for 2 to 4 minutes, stirred at high speed for 1 to 2 minutes, and then fermented at a temperature of 2 to 4° C. and a relative humidity of 90 to 95% for 15 to 18 hours;
a dough process in which the resulting mixture of the cold sponge process is mixed with 12 to 13.5 parts by weight strong flour, 2.1 to 2.7 parts by weight sugar, 0.45 to 0.54 parts by weight salt, 0.9 to 1.5 parts by weight dried milk, 0.09 to 0.15 parts by weight dried yeast, 2.1 to 3 parts by weight margarine, and 8.1 to 9.3 parts by weight water, and the resulting mixture is given a floor time of 15 to 20 minutes and a bench time of 15 to 20 minutes and then divided into dough pieces; and
a second fermentation process in which each of the divided dough pieces is molded and subjected to a second fermentation at a temperature of 36 to 40° C. and a relative humidity of 90 to 95% for 50 to 60 minutes.

2. The method of claim 1, wherein the fermentation temperature of the cold sponge process is 3° C.

3. The method of claim 1 wherein the fermentation time of the cold sponge process is 16 hours.

4. A bread made by the method of claim 1.

5. The method of claim 2 wherein the fermentation time of the cold sponge process is 16 hours.

6. A bread made by the method of claim 2.

7. A bread made by the method of claim 3.

8. A bread made by the method of claim 5.

* * * * *